(12) United States Patent
Nennemann et al.

(10) Patent No.: US 11,648,517 B2
(45) Date of Patent: May 16, 2023

(54) AERATION CONE FOR HYDRAULIC TURBINE

(71) Applicant: ANDRITZ HYDRO CANADA INC., Pointe-Claire (CA)

(72) Inventors: Bernd Nennemann, Pointe-Claire (CA); Samer Afara, Pointe-Claire (CA)

(73) Assignee: ANDRITZ HYDRO CANADA INC., Pointe-Claire (CA)

( * ) Notice: Subject to any disclaimer, the term of this patent is extended or adjusted under 35 U.S.C. 154(b) by 123 days.

(21) Appl. No.: 17/340,467

(22) Filed: Jun. 7, 2021

(65) Prior Publication Data
US 2022/0387943 A1 Dec. 8, 2022

(51) Int. Cl.
*B01F 3/04* (2006.01)
*B01F 25/64* (2022.01)
(Continued)

(52) U.S. Cl.
CPC .......... *B01F 25/64* (2022.01); *B01F 23/232* (2022.01); *B01F 23/233* (2022.01);
(Continued)

(58) Field of Classification Search
CPC .......... B01F 23/232; B01F 23/233; B01F 23/233642; B01F 23/237611; B01F 25/3121; B01F 25/31232; B01F 25/64; B01F 27/911; B01F 2101/305; F03B 3/02; F03B 11/002; F03B 11/04
See application file for complete search history.

(56) References Cited

U.S. PATENT DOCUMENTS 1,942,995 A * 1/1934 Biggs .................. F03B 3/125
 415/115
3,305,215 A * 2/1967 Swiecicki ............. F03B 11/002
 261/87

(Continued)

FOREIGN PATENT DOCUMENTS

EP 2873851 5/2015

OTHER PUBLICATIONS

International Application No. PCT/IB2021/056195, International Search Report and Written Opinion dated Feb. 8, 2022, 11 pages.
(Continued)

*Primary Examiner* — Charles S Bushey
(74) *Attorney, Agent, or Firm* — Kilpatrick Townsend & Stockton LLP (57) ABSTRACT

An aeration apparatus for aerating water discharged from a hydraulic turbine includes: a manifold disposed within a crown of a runner of the hydraulic turbine; a plurality of radial pipes extending radially from an outer perimeter of the manifold and in fluid communication with the manifold; and one or more air injectors having a first end disposed within an aeration pipe, each of the one or more air injectors having a second end extending into a nozzle at a first end of one of the radial pipes. Rotation of the aeration apparatus resulting from rotation of the runner causes pumping of water from the manifold through the radial pipes past the one or more air injectors, and water flowing past the one or more air injectors causes air to become entrained in the water. The radial pipes discharge the water and entrained air from the aeration apparatus.

20 Claims, 8 Drawing Sheets

(51) Int. Cl.
*B01F 23/232* (2022.01)
*B01F 23/233* (2022.01)
*B01F 25/312* (2022.01)
*B01F 27/91* (2022.01)
*B01F 23/237* (2022.01)
*B01F 101/00* (2022.01)

(52) U.S. Cl.
CPC .... *B01F 25/3121* (2022.01); *B01F 25/31232* (2022.01); *B01F 27/911* (2022.01); *B01F 23/233642* (2022.01); *B01F 23/237611* (2022.01); *B01F 2101/305* (2022.01)

(56) References Cited

U.S. PATENT DOCUMENTS

| | | | |
|---|---|---|---|
| 4,780,051 A | 10/1988 | Fisher, Jr. | |
| 5,879,130 A * | 3/1999 | Beyer | F03B 11/002 415/115 |
| 5,924,842 A | 7/1999 | Beyer et al. | |
| 5,924,844 A | 7/1999 | Cybularz et al. | |
| 6,454,533 B2 * | 9/2002 | Beyer | F03B 3/125 416/188 |
| 6,524,063 B1 * | 2/2003 | Beyer | F03B 3/125 415/115 |
| 6,971,843 B2 * | 12/2005 | Desy | F03B 3/02 261/93 |
| 7,044,452 B2 * | 5/2006 | Demers | F03B 11/002 261/93 |
| 10,323,620 B2 * | 6/2019 | Sabourin | F03B 3/02 |
| 2014/0186157 A1 | 7/2014 | Murai | |
| 2020/0141380 A1 | 5/2020 | Lin | |

OTHER PUBLICATIONS

Desy et al., The Dissolved Oxygen Experience at Canyon Ferry, Proceedings of HydroVision, Jul. 2004, 7 pages.

Hogan et al., EPRI-DOE Conference on Environmentally-Enhanced Hydropower Turbines: Technical Papers, Electric Power Research Institute (EPRI), Available Online at: https://www.semanticscholar.org/paper/EPRI-DOE-Conference-on-Environmentally-Enhanced-Hogan/8d97f91f1976dbcd3ec31c3f31cf420b02cad946?p2df, 2011, 266 pages.

March et al., Industry Experience with Aerating Turbines, EPRI research on aerating turbine technologies, Available Online at: https://www.researchgate.net/publication/314855911_Industry_Experience_with_Aerating_Turbines, Jul. 2015, 33 pages.

Miletta et al., Study of Air Bubble Formation for Wastewater Treatment, Energy in water and wastewater treatment, Available Online at: https://www.researchgate.net/publication/267489088_Study_of_Air_Bubble_Formation_for_Wastewater_Treatment, Jan. 2011, 6 pages.

Rohland et al., Equipment: Aerating Turbines for Duke Energy's New Bridgewater Powerhouse, Hydro Review Content Directors, Available Online at: https://www.hydroreview.com/world-regions/equipment-aerating/#gref, Apr. 1, 2010, 7 pages.

Bane, Aeration Diffusers—Fixed or Liftable Systems? http://www.magytec.com/Magytec_International/Aeration_Technology_files/Liftablesystems.pdf, Mar. 18, 2004, 5 pages, Available Online at https://www.magytec.com.au/liftable-or-fixed-aeration-diffuser.

* cited by examiner

AERATION CONE FOR HYDRAULIC TURBINE

BACKGROUND

Unless otherwise indicated herein, the materials described in this section are not prior art to the claims in this application and are not admitted to be prior art by inclusion in this section.

A hydraulic turbine is a mechanical device that converts the potential energy contained in an elevated body of water (a river or reservoir) into rotational mechanical energy. Reaction turbines, for example, Francis turbines, operate with their runners fully flooded and develop torque because of the reaction of water pressure against runner blades. The principal components of a turbine consist of a runner, a water supply case to convey the water to the runner, wicket gates to control the quantity of water and distribute it equally to the runner, and a draft tube to convey the water away from the turbine. In a Francis turbine, for example, water enters the turbine in a radial direction with respect to the shaft, and is discharged in an axial direction.

Aeration is used in hydraulic turbines to mitigate pressure pulsation, vibration and/or noise problems. In some cases, aeration is used to mitigate cavitation or to provide sufficiently high dissolved oxygen levels to the water exiting the turbine to ensure oxygen levels needed for aquatic life to survive. Depending on the submergence level of the turbine, natural aeration may not be possible. External additional blowers or compressors represent an additional cost and require maintenance and space, which may not be desirable; as such, they are not a cost-effective solution or may not be feasible. In some cases, hydraulic turbine operators object to the use of blowers or compressors to ensure enough air supply. A solution is needed for situations where the submergence is too high for conventional natural aeration and a blower or compressor cannot be used.

SUMMARY

Systems and apparatuses for aerating water discharged from a hydraulic turbine are provided.

According to various aspects there is provided an aeration apparatus for aerating water discharged from a hydraulic turbine. In some aspects, the aeration apparatus may include: a central manifold disposed within a crown of a runner of the hydraulic turbine; a plurality of radial pipes extending radially from an outer perimeter of the central manifold and configured to be in fluid communication with the central manifold; and one or more air injectors having a first end disposed within an aeration pipe, each of the one or more air injectors having a second end extending into a nozzle at a first end of one of the plurality of radial pipes. The plurality of radial pipes are configured to pump water from the central manifold past the one or more air injectors when the runner rotates. The one or more air injectors are configured to cause air to become entrained in the water. The plurality of radial pipes are configured to discharge the water and entrained air from the aeration apparatus.

According to various aspects there is provided hydraulic turbine runner. In some aspects, the hydraulic turbine runner may include: a crown; a plurality of runner blades coupled to the crown; and an aeration apparatus configured for aerating water discharged from a hydraulic turbine disposed within the crown. The aeration apparatus may include: a central manifold disposed within a crown of a runner of the hydraulic turbine; a plurality of radial pipes extending radially from an outer perimeter of the central manifold and configured to be in fluid communication with the central manifold; and one or more air injectors having a first end disposed within an aeration pipe, each of the one or more air injectors having a second end extending into a nozzle at a first end of one of the plurality of radial pipes. The plurality of radial pipes are configured to pump water from the central manifold past the one or more air injectors when the runner rotates. The one or more air injectors are configured to cause air to become entrained in the water. The plurality of radial pipes are configured to discharge the water and entrained air from the aeration apparatus.

According to various aspects there is provided a hydraulic turbine. In some aspects, hydraulic turbine may include: a turbine shaft; and a turbine runner coupled to the turbine shaft. turbine runner may include: a crown; a plurality of runner blades coupled to the crown; and an aeration apparatus configured for aerating water discharged from a hydraulic turbine disposed within the crown. The aeration apparatus may include: a central manifold disposed within a crown of a runner of the hydraulic turbine; a plurality of radial pipes extending radially from an outer perimeter of the central manifold and configured to be in fluid communication with the central manifold; and one or more air injectors having a first end disposed within an aeration pipe, each of the one or more air injectors having a second end extending into a nozzle at a first end of one of the plurality of radial pipes. The plurality of radial pipes are configured to pump water from the central manifold past the one or more air injectors when the runner rotates. The one or more air injectors are configured to cause air to become entrained in the water. The plurality of radial pipes are configured to discharge the water and entrained air from the aeration apparatus.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Similar reference characters indicate corresponding parts throughout the several views unless otherwise stated. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure.

Except as otherwise expressly stated herein, the following rules of interpretation apply to this specification: (a) all words used herein shall be construed to be of such gender or number (singular or plural) as to circumstances require; (b) the singular terms "a," "an," and "the," as used in the specification and the appended claims include plural references unless the context clearly dictates otherwise; (c) the antecedent term "about" applied to a recited range or value denotes an approximation within the deviation in the range or values known or expected in the art from the measurements; (d) the words "herein," "hereby," "hereto," "hereinbefore," and "hereinafter," and words of similar import, refer to this specification in its entirety and not to any particular paragraph, claim, or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms, "comprising," "having," "including," and "containing" are to be construed as open-ended terms (i.e., meaning "including but not limited to").

Recitation of ranges of values herein are merely intended to serve as a shorthand method of referring individually to each separate value falling within the range of within any sub ranges there between, unless otherwise clearly indicated herein. Each separate value within a recited range is incorporated into the specification or claims as if each separate value were individually recited herein. Where a specific range of values is provided, it is understood that each intervening value, to the tenth or less of the unit of the lower limit between the upper and lower limit of that range and any other stated or intervening value in that stated range or sub range hereof, is included herein unless the context clearly dictates otherwise. All subranges are also included. The upper and lower limits of these smaller ranges are also included therein, subject to any specifically and expressly excluded limit in the stated range.

Figure 1:
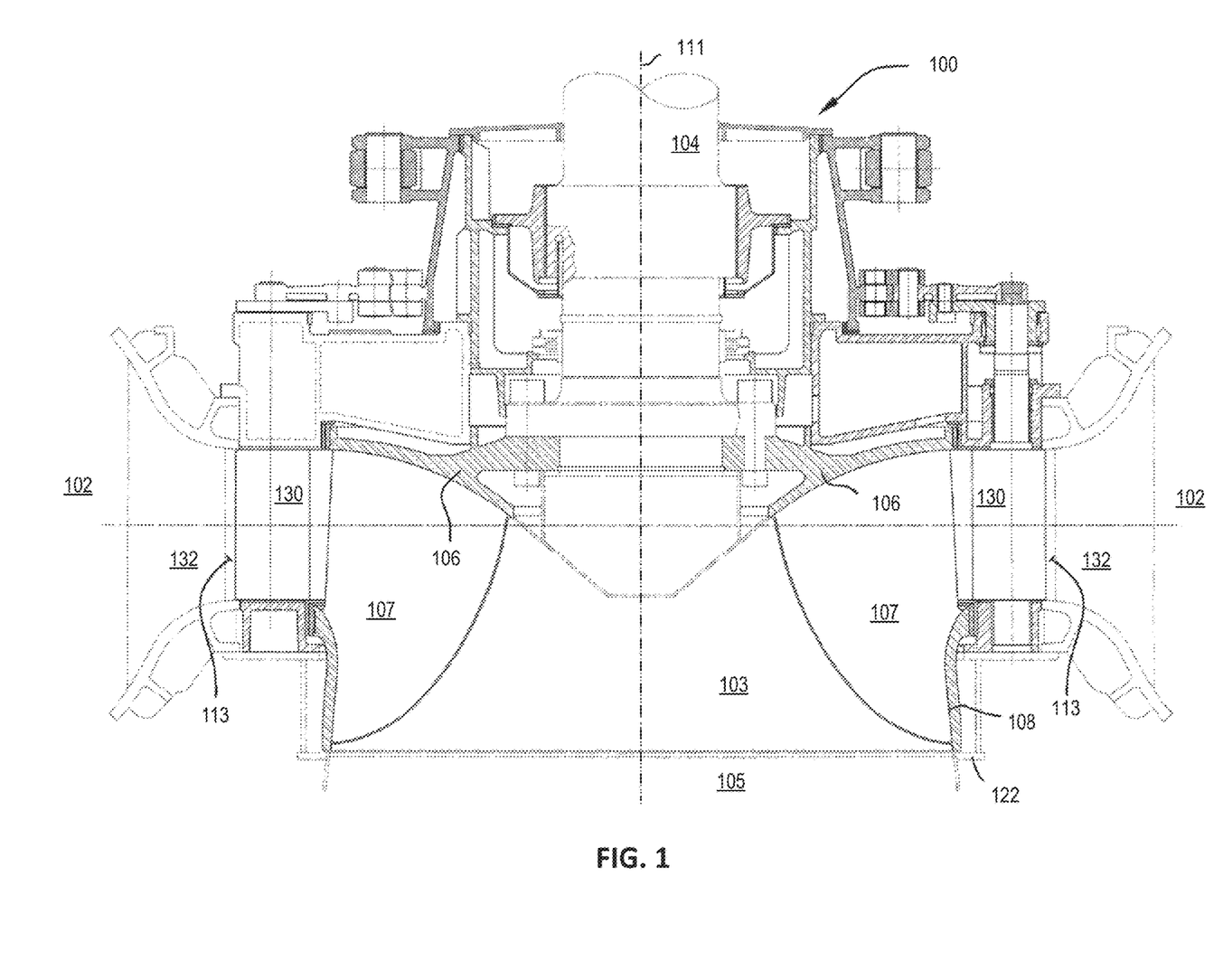
FIG. 1 is diagram illustrating an example of a Francis hydraulic turbine according to some aspects of the present disclosure.

FIG. 1 is diagram illustrating an example of a hydraulic turbine 100 according to some aspects of the present disclosure. The hydraulic turbine 100 may be configured to convert hydraulic energy to torque to drive an electrical generator (not shown) through a turbine shaft 104. Water typically flows through a spiral casing 102 into a distributor 132 surrounding a rotating runner 103 of the hydraulic turbine 100. The distributor 132 may have stay vanes 113 and guide vanes 130. Water flows inward into the runner 103 in a generally spiraling motion along a horizontal direction inside a turbine having an axis 111. The rotational velocity of the water drives the runner 103 to turn around the axis 111. As the water flows through the runner 103, the transport component of the water is turned from a horizontal flow to a generally vertical outflow. From the runner 103, water flows into a vertical cone of the draft tube 105 below the runner 103.

The runner 103 of a turbine may include a crown 106 having a surface of revolution extending towards the annular band 108 along the axis 111 of the runner 103, and blades 107 extending out from the surface of revolution of the crown 106 to an annular band 108. Each blade 107 has a leading edge and a trailing edge. The ends of these edges are joined to the crown 106 and the annular band 108. The runner 103 may be located above a bottom ring 122 in the hydraulic turbine 100. Water enters the runner 103, flows around the leading edges of the blades, flows between the blades 107, and passes over the trailing edges of the blades, then flows into the draft tube 105.

In some cases, air may be introduced into the water leaving a hydraulic turbine. The aeration may be provided, for example, to mitigate pressure pulsation, vibrations, noise problems, and/or cavitation, or to provide sufficiently high dissolved oxygen levels to the water exiting the turbine to ensure oxygen levels needed for aquatic life.

Figure 2:
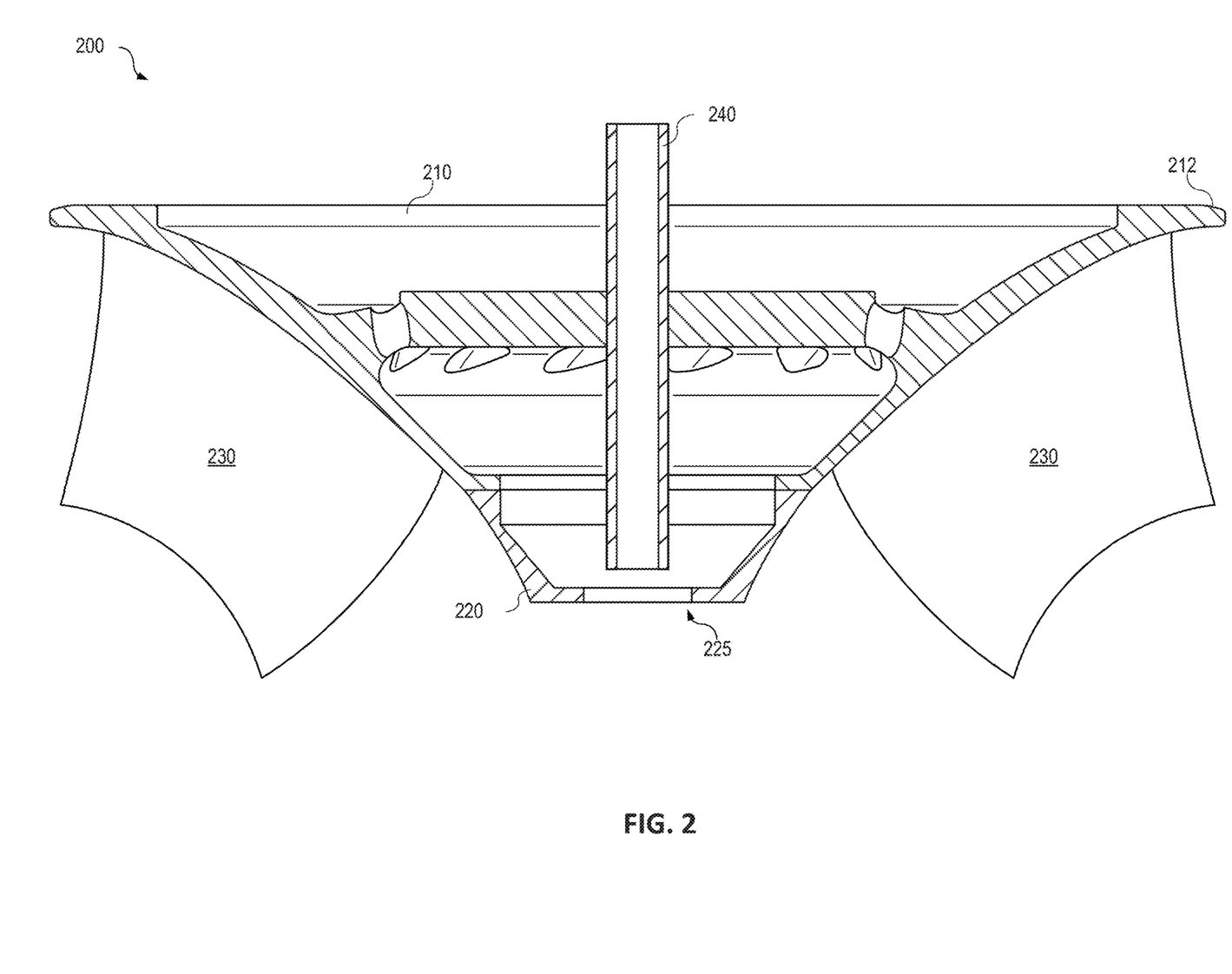
FIG. 2 is a cutaway view of an example of a hydraulic turbine runner according to various aspects of the present disclosure.

FIG. 2 is a cutaway view of an example of a hydraulic turbine runner 200 according to some aspects of the present disclosure. Referring to FIG. 2, the hydraulic turbine runner 200 may include a crown 210, a cap 220, runner blades 230, and an aeration shaft 240. The aeration shaft 240 may be a hollow portion of the turbine shaft (e.g., the main shaft 104). The cap 220 and the runner blades 230 may be attached to the crown 210 and the crown 210 may be attached to the aeration shaft 240. Water flowing across the runner blades 230 causes the runner blades 230, the crown 210, the cap 220, and the aeration shaft 240 to rotate. The rotating hydraulic turbine runner 200 also creates low pressure in the water being discharged from the turbine (e.g., into the draft tube 105). Natural aeration may be possible via a hole 225 in the cap 220 from air drawn into the aeration shaft 240 when atmospheric pressure is higher than the low water pressure created by the turbine. Natural aeration may depend on the submergence level of the turbine, and may not be possible for deeply submerged turbines.

Exemplary embodiments of the present disclosure can provide aeration when natural aeration is not feasible by generating a controlled pumping action in the hydraulic turbine runner cap and crown chamber. The controlled pumping action may result in air flow through the hollow turbine shaft and/or the head cover chamber into the water passages of the turbine. The pumping action is achieved by the geometric configuration of the pumping elements together with the rotation of the runner. According to some aspects of the present disclosure, an optimal ratio of pumped water to entrained air, as well as air bubble dispersion to ensure air transport against adverse pressure and to prevent choking, are provided. Self-aeration (e.g., without the use of pumps, fans, etc.) is only possible when the fluid pressure at an air injection location falls below ambient air pressure (e.g., atmospheric pressure) in the turbine pit. The exemplary embodiments can lower the fluid pressure at the air injection location and provide a path for the air and water mixture to flow into the runner channels or into the main flow passage downstream of the runner.

Figure 3:
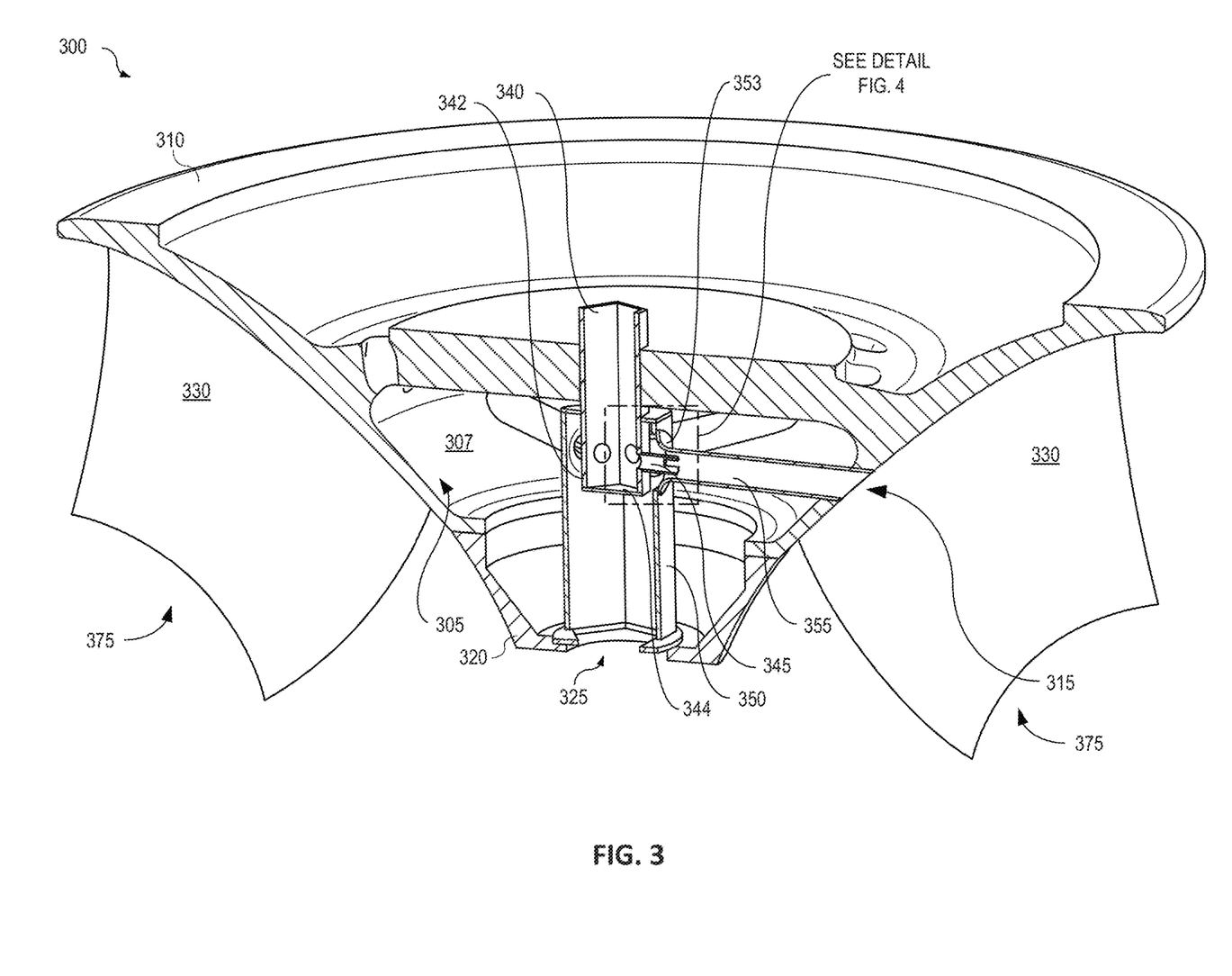
FIG. 3 is a cutaway view of an example of a hydraulic turbine runner according to some aspects of the present disclosure.

FIG. 3 is a cutaway view of an example of a hydraulic turbine runner 300 according to some aspects of the present disclosure. Referring to FIG. 3, the hydraulic turbine runner 300 may include a crown 310, a cap 320, runner blades 330, and a central aeration pipe 340. A crown chamber 305 may include an inner portion 307 of the crown 310 and the cap 320. The central aeration pipe 340 may be a portion of the turbine shaft (e.g., the main shaft 104) or a structure disposed within the turbine shaft. The central aeration pipe 340 may further include air injectors 345. In order to provide the controlled pumping action, the hydraulic turbine runner 300 may further include a central manifold 350 and radial pipes 355. The radial pipes 355 may extend from the central manifold 350 to water outlet ports 315 provided in the crown 310 (e.g., the crown chamber 305). The radial pipes 355 may be disposed horizontally (e.g., in a plane perpendicular to the central manifold 350). In some implementations, the radial pipes 355 may be disposed at an angle to a plane perpendicular to the central manifold 350 and/or disposed at an angle to a plane parallel to a vertical centerline of the central manifold.

The bottom of the cap 320 may include a water intake port 325 to enable water to be drawn into the central manifold 350. In some implementations, the cap and the crown may be integrated. In such configurations, the water intake port may be disposed in the bottom portion of the crown and the central manifold may extend into the bottom portion of the crown toward the water intake port.

As illustrated in FIG. 3, water outlet ports 315 may be formed around the periphery of the crown chamber 305. In some implementations, the ports may be formed around the periphery of the cap 320. The radial pipes 355 may connect the water outlet ports 315 to the central manifold 350. The radial pipes 355 may be in fluid communication with the central manifold 350 and may provide fluid communication between the central manifold 350 and the water outlet ports 315. The radial pipes 355 may be provided for all runner channels 375 (e.g., the spaces between the runner blades 330) or for any subset of runner channels 375.

The central aeration pipe 340 may be in fluid communication with outside ambient air, for example, through a central aeration hole of the turbine shaft (not shown). A lower portion 342 of the central aeration pipe 340 may be coupled to and in fluid communication with the air injectors 345. The central aeration pipe 340 may be isolated from the water in the central manifold 350. For example, the lower portion 342 of the central aeration pipe 340 may include a solid portion 344 configured to seal the lower portion 342 to prevent water in the central manifold 350 from entering the central aeration pipe 340.

The air injectors 345 may be disposed radially around the periphery of the central aeration pipe 340. The air injectors 345 may be disposed inside nozzles 353 formed by the radial pipes 355 at the connection points of the central manifold 350 and the radial pipes 355. The nozzles 353 may allow for a smooth transition of water flow from the central manifold 350 to the radial pipes 355.

Figure 4:
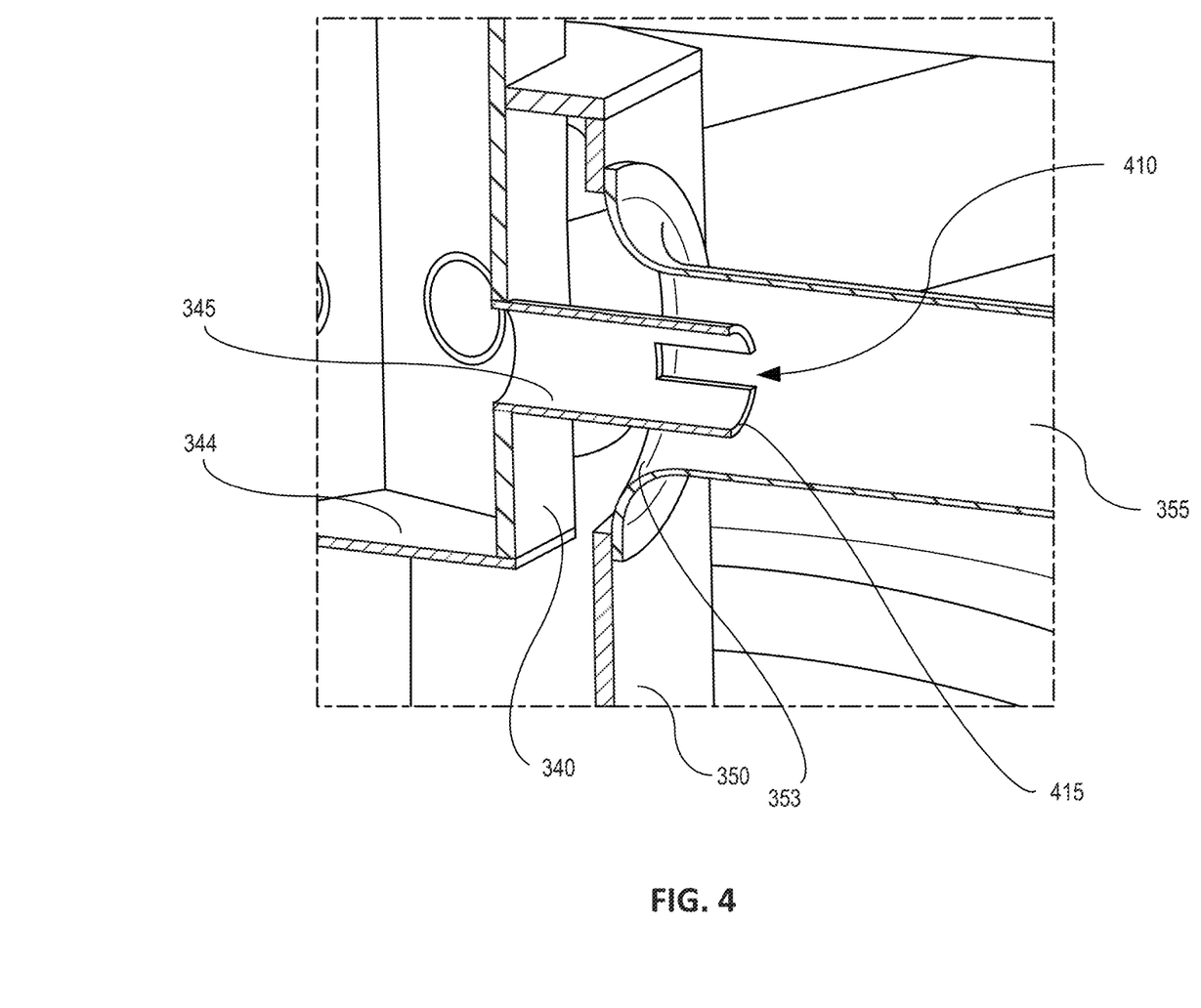
FIG. 4 is a cutaway view illustrating an example of air injector and a nozzle shown in FIG. 3 according to some aspects of the present disclosure.

FIG. 4 is a cutaway view illustrating an example of an air injector 345 and a nozzle 353 shown in FIG. 3 according to some aspects of the present disclosure. As shown in FIG. 4, the air injectors 345 may include features 410, for example, but not limited to, various configurations of one or more holes, slots, and/or grooves located towards the air injection end 415 of the air injector 345 and peripherally disposed around the air injection end 415. These features 410 may influence air entrainment and air bubble breakup. The nozzles 353 may provide a smooth transition of the water flow from the central manifold 350 to the radial pipes 355 and may provide a Venturi effect thereby reducing local fluid pressure.

Figure 5:
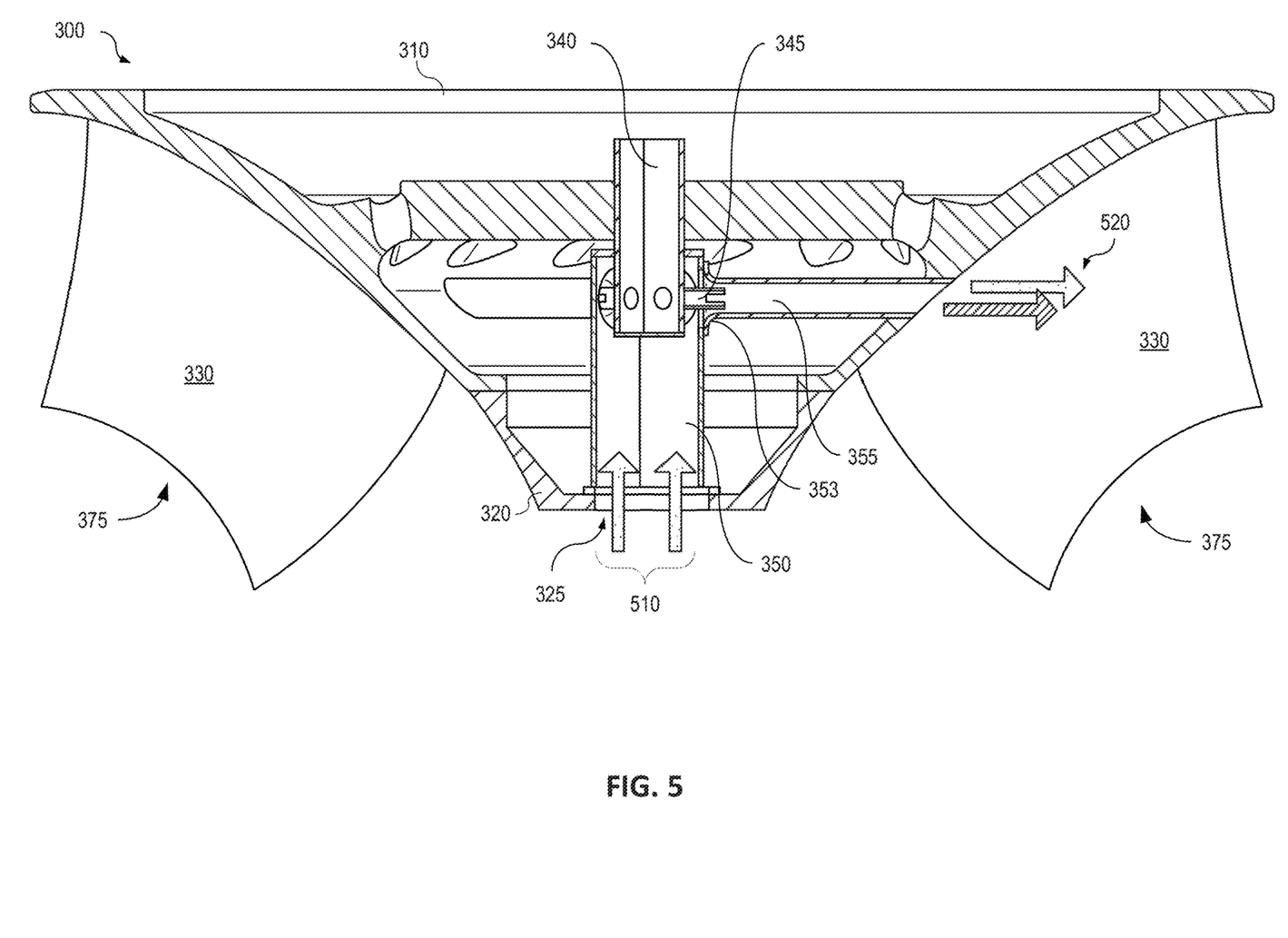
FIG. 5 is a cutaway view illustrating water flow resulting from the pumping action of the exemplary hydraulic turbine runner according to some aspects of the present disclosure.

FIG. 5 is a cutaway view illustrating water flow resulting from the pumping action of the exemplary hydraulic turbine runner 300 according to some aspects of the present disclosure. The central manifold 350, nozzles 353, and radial pipes 355 may allow water to pass from the water intake port 325 at the bottom of the cap 320 and/or from the crown chamber 305 into the runner channels 375. In some implementations, the water may alternatively or additionally pass into the main water flow passage downstream of the runner channels 375.

A pumping action is generated through centrifugal forces resulting from the rotation of all components inside the hydraulic turbine runner 300 rotating as the hydraulic turbine runner 300 rotates. A larger radius may generate a larger pumping action; therefore, much of the pumping action is generated in the radial pipes 355. The external diameter of the radial pipes 355, e.g., where they enter the runner channels 375 through the water outlet ports 315 in the crown chamber 305 together with the rotation speed of the hydraulic turbine runner 300 can determine the pressure differential that the pumping action can generate. Due to this pumping effect, the fluid pressure may decrease radially inwards towards the central aeration pipe 340. The fluid pressure may be further decreased due to the Venturi effect resulting from the water accelerating through the nozzles 353 and the small cross-sectional area created between the air injectors 345 and radial pipes 355.

Referring to FIG. 5, the pumping effect may cause water 510 to be drawn into the central manifold 350, accelerated through the nozzles 353 and radial pipes 355 as it passes the air injectors 345 where the water may become aerated, and discharged to the runner channels 375 through the water outlet ports 315 in the crown chamber 305 as an air-water mixture 520. The Venturi effect resulting from the water accelerating through the nozzles 353 and the small cross-sectional area created between the air injectors 345 and radial pipes 355 may cause air to be drawn in and mixed with the water as it passes the air injectors 345. The shape of the air injectors may be configured for air bubble break-up. For example, the air injectors 345 may be configured with one or more slots, ports, or combinations thereof. The amount of water flow and the generated pressure can be controlled by modifying the dimensions of any or all the water intake port 325, the nozzles 353, the radial pipes 355, the water outlet ports 315, and the air injectors 345.

Under certain conditions, the fluid pressure at the air injectors 345 may decrease below ambient air pressure (e.g., the air pressure in the turbine pit at the hollow turbine shaft inlet) and result in air being injected into the water flowing past the air injectors 345. The air injectors may be configured to break the air up into small bubbles. The small bubbles can provide for efficient mixing of the air with the water and transport of the aerated water out of the radial pipes 355 and into the runner channels 375. The combination of the water intake port 325 in the cap 320, the crown chamber 305, the central manifold 350, the nozzles 353, the radial pipes 355, the central aeration pipe 340, and the air injectors 345 can result in an efficient water pumping and air entrainment action, which can be configured to specific requirements through the geometric parameters of the individual elements. Non-limiting examples of modifications to the geometric parameters may include: a ratio of the cross section areas of the nozzle to the air injector; a ratio of the cross section area of the intake port to the cross section area of all nozzles minus air injectors; air injector shape (e.g., slots, holes, etc.); shape of the nozzle to pipe transition; shape of the bottom of the aeration pipe; and curving the radial pipes in a circumferential direction. Other modifications to the geometric parameters may be made without departing from the scope of the present disclosure.

In some implementations, a control valve to regulate the pumped water flow rate may be provided. The control valve may be located inside the central manifold, elsewhere in the pumped water flow passage, or below the runner cap. The control valve may allow stopping or reducing the pumped water flow when not needed, for example, during operation of the turbine near a best efficiency point when no pressure pulsations need to be mitigated, and may improve the efficiency of the turbine.

Figure 6:
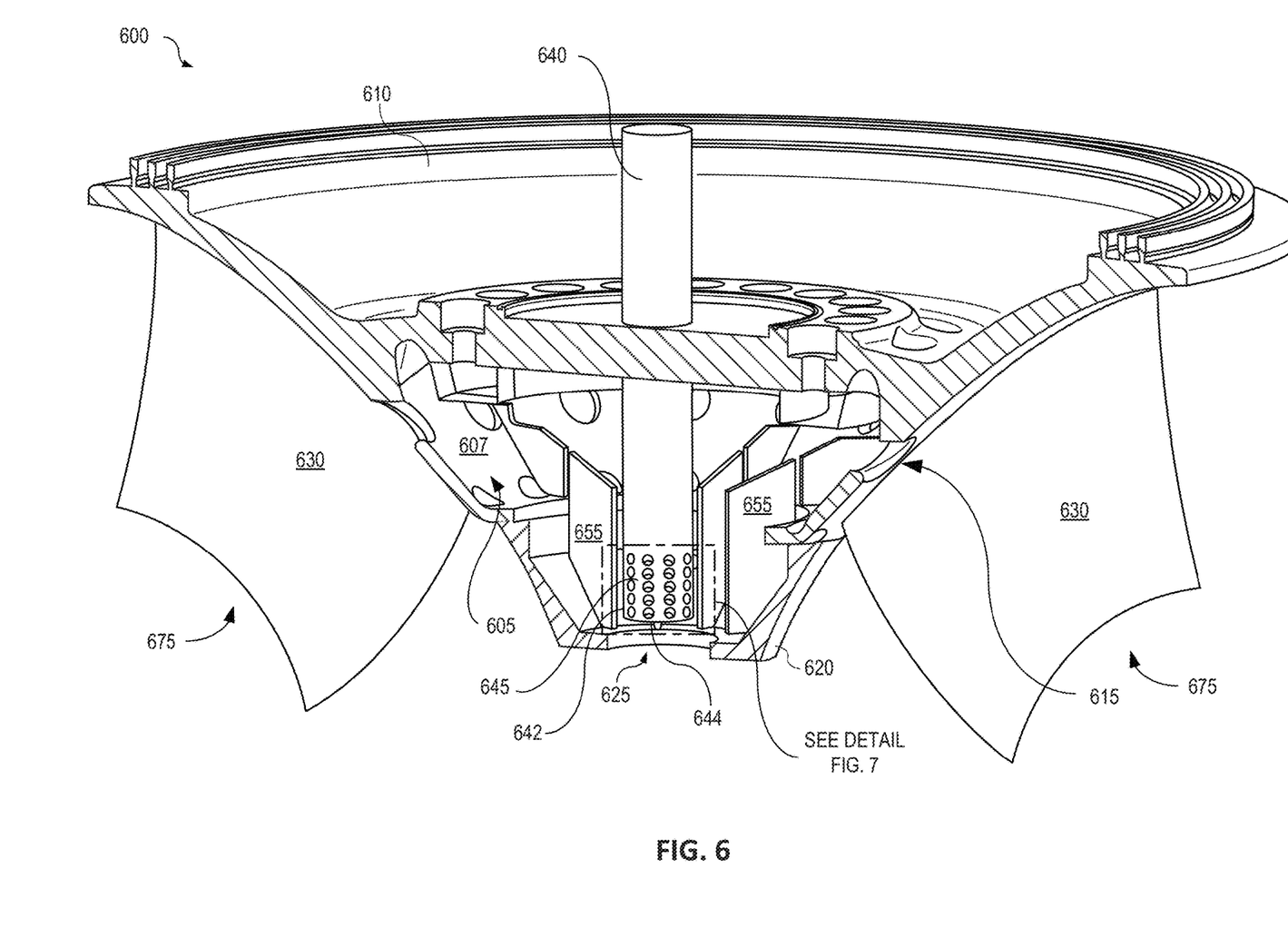
FIG. 6 is a cutaway view of another example of a hydraulic turbine runner according to some aspects of the present disclosure.

FIG. 6 is a cutaway view of another example of a hydraulic turbine runner 600 according to some aspects of the present disclosure. Referring to FIG. 6, the hydraulic turbine runner 600 may include a crown 610, a cap 620, runner blades 630, and a central aeration pipe 640. A crown chamber 605 may include an inner portion 607 of the crown 610 and the cap 620. The central aeration pipe 640 may be a portion of the turbine shaft (e.g., the main shaft 104) or a structure disposed within the turbine shaft. The central aeration pipe 640 may further include an air injector 645. In order to provide the controlled pumping action, the hydraulic turbine runner 600 may further include radial ribs 655 disposed around the periphery of the crown chamber 605 and water outlet ports 615 provided around the periphery of the crown chamber 605.

In some implementations, the radial ribs may be curved ribs or ribs having other shapes, for example, shapes conforming to the profile of the crown chamber, may be disposed in the cap 320, and the water outlet ports may be provided around the periphery of the cap. In some implementations, each radial rib may be a single piece rib and may be attached to the inner portion of the crown chamber and extend into the cap toward the water intake port. In some implementations, each radial rib may include multiple pieces, for example, one piece attached to the inner portion of the crown chamber and another piece attached to the inner portion of the cap. In some implementation, radial ribs may be retrofit to existing turbine runners. In such retrofit applications, some or all existing holes in the crown and/or cap may be blocked and the shape of the radial ribs adjusted for the specific application. For example, notches may be formed in the radial ribs to provide clearance for existing components in the crown chamber.

The bottom of the cap 320 may include a water intake port 325 to enable water to be drawn into the crown chamber 305. In some implementations, the cap and the crown may be integrated. In such configurations, the water intake port may be disposed in the bottom portion of the crown and the radial ribs may extend into the bottom portion of the crown toward the water intake port.

The central aeration pipe 640 may be in fluid communication with outside ambient air, for example, through a central aeration hole of the turbine shaft (not shown). A lower portion 642 of the central aeration pipe 640 may be coupled to and in fluid communication with the air injector 645. The central aeration pipe 640 may be isolated from the water drawn into the crown chamber 605. For example, the lower portion 642 of the central aeration pipe 640 may include a solid portion 644 configured to seal the lower portion 642 to prevent water drawn into the crown chamber 605 through the water intake port 625 from entering the central aeration pipe 640.

The air injector 645 may be disposed at the lower portion 642 of the central aeration pipe 640. In some implementations the air injector 645 may be formed as a portion of the central aeration pipe 640. In some implementations the air injector 645 may be a separate element coupled to the lower portion 642 of the central aeration pipe 640.

Figure 7:
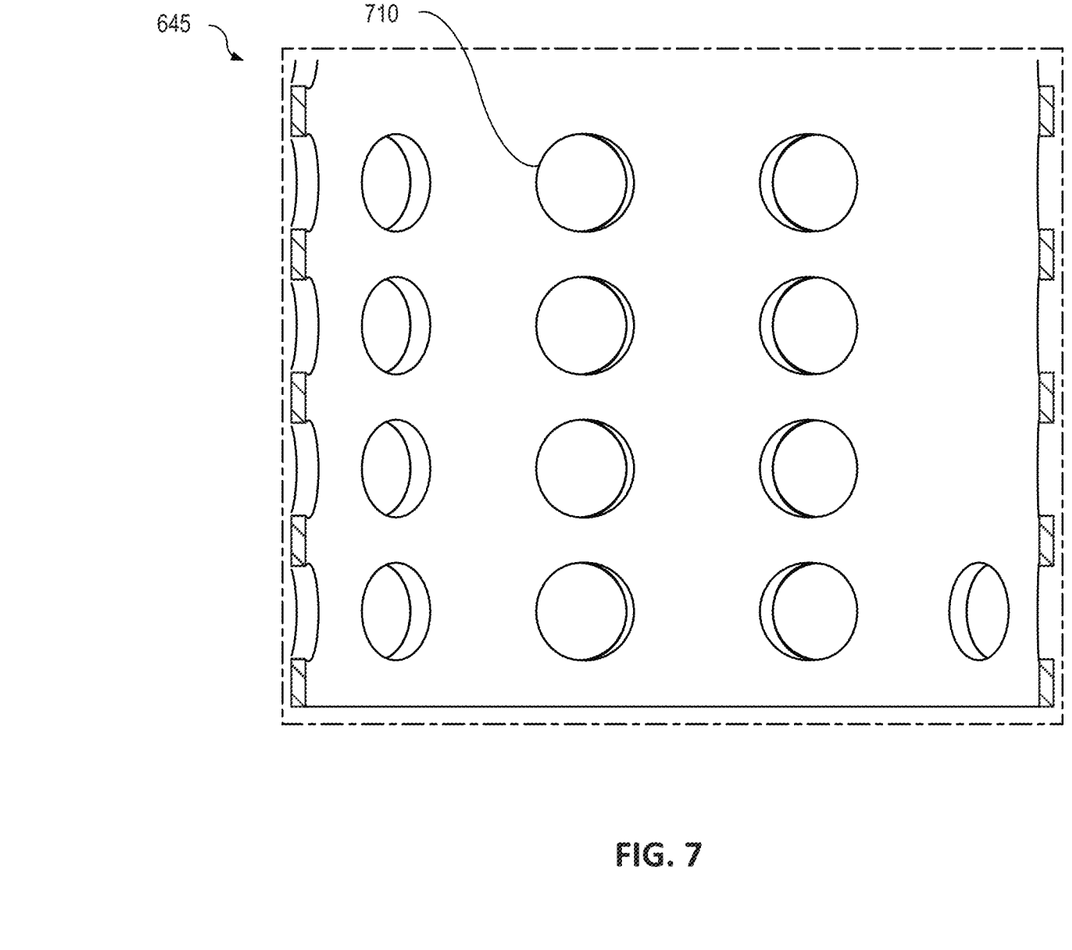
FIG. 7 is a cutaway view illustrating an example of an air injector shown in FIG. 6 according to some aspects of the present disclosure.

FIG. 7 is a cutaway view illustrating an example of an air injector 645 shown in FIG. 6 according to some aspects of the present disclosure. As shown in FIG. 7, the air injectors 645 may include features 710, for example, but not limited to, various configurations of one or more slots, holes, or combinations thereof located around the periphery of the air injector 645. The location and shape of the features 710 of the air injector 645 may be configured for air entrainment and bubble breakup.

Figure 8:
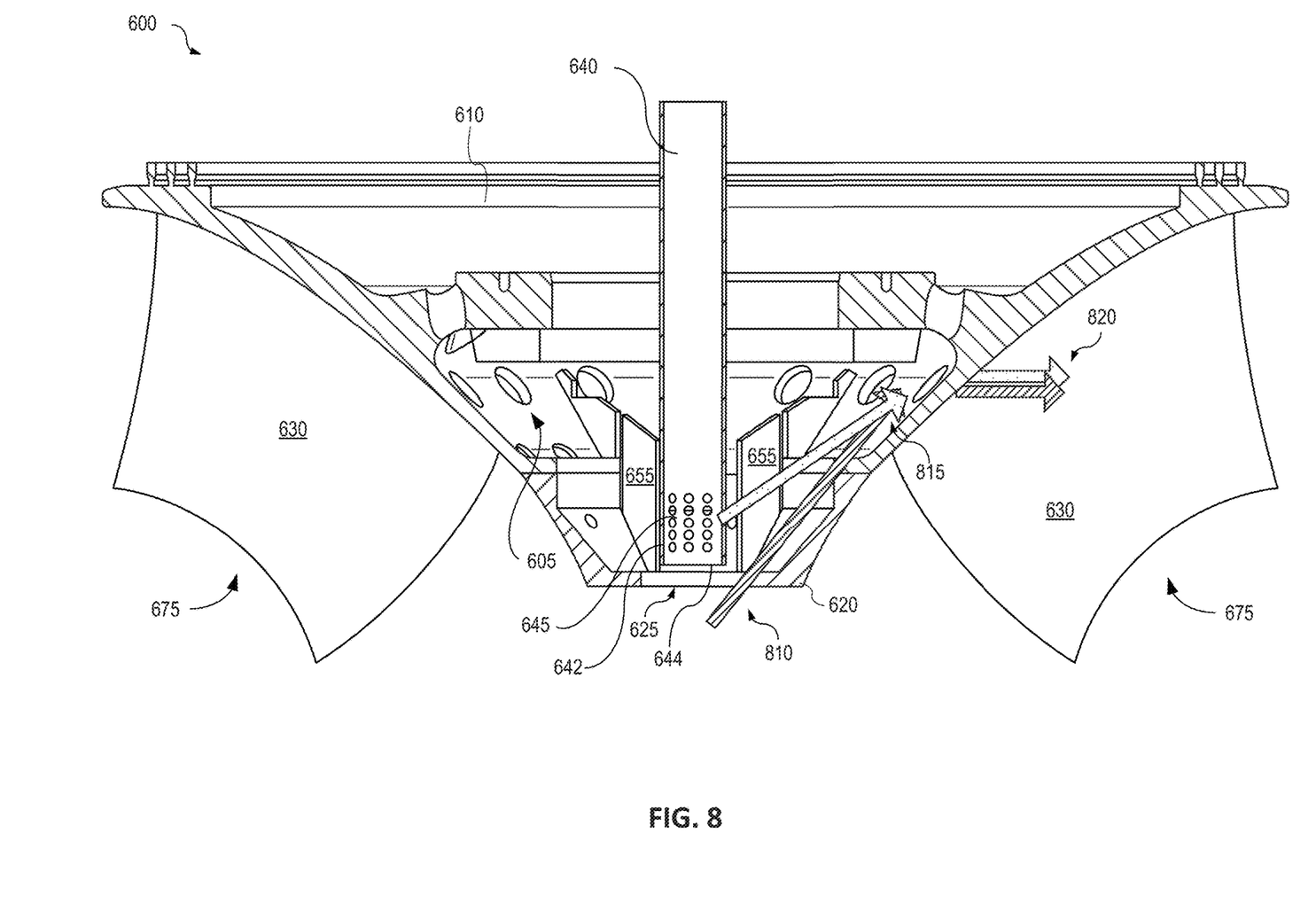
FIG. 8 is a cutaway view illustrating water flow resulting from the pumping action of the exemplary hydraulic turbine runner according to some aspects of the present disclosure.

FIG. 8 is a cutaway view illustrating water flow resulting from the pumping action of the exemplary hydraulic turbine runner 600 according to some aspects of the present disclosure. The radial ribs 655 may pump water from the water intake port 625 at the bottom of the cap 620 and/or from the crown chamber 605 into the runner channels 675. In some implementations, the water may alternatively or additionally pass into the main water flow passage downstream of the runner channels 675.

A pumping action is generated through centrifugal forces resulting from the rotation of all components inside the hydraulic turbine runner 600 rotating as the runner rotates. The external diameter of the radial ribs 655 located near the water outlet ports 615 together with the rotation speed of the hydraulic turbine runner 600 can determine the pressure differential that the pumping action can generate. Due to this pumping effect, the fluid pressure may decrease radially inwards towards the central aeration pipe 640. The fluid pressure may be further decreased due to the Venturi effect resulting from the water accelerating through the smaller cross-section available for the water flow between the air injector 645 and the bottom of the cap 620 or through the crown chamber 605.

Referring to FIG. 8, the pumping effect may cause water 810 to be drawn into crown chamber 605, accelerated through the smaller cross-section between the air injector 645 and the bottom of the cap 620. As the water 810 passes the air injector 645, air 815 may be drawn in from the central aeration pipe 640. The water may become aerated and may be discharged to the runner channels 675 through the water outlet ports 615 in the crown chamber 605 as an air-water mixture 820. The Venturi effect resulting from the water accelerating through the small cross-sectional area may cause air to be drawn in and mixed with the water as it passes the air injectors 645. The shape of the air injector may be configured for air bubble break-up. For example, the air injector 645 may be configured with one or more slots, holes, or combinations thereof. The amount of water flow and the generated pressure can be controlled by modifying the dimensions of any or all the water intake port 625, the radial ribs 655, the water outlet ports 615, and the air injector 645.

Under certain conditions, the fluid pressure at the air injector 645 may decrease below ambient air pressure (e.g., the air pressure in the turbine pit at the hollow turbine shaft inlet) and result in air being injected into the water flowing past the air injector 645. The features 710 (e.g., the various configurations of one or more slots, holes, or combinations thereof) of the air injector 645 may be configured to break the air up into small bubbles. The small bubbles can provide for efficient mixing of the air with the water and transport of the aerated water out of the water outlet ports 615 and into the runner channels 675. The combination of the water intake port 625 in the cap 620, the crown chamber 605, the radial ribs 655, the central aeration pipe 640, and the air injector 645 can result in an efficient water pumping and air entrainment action, which can be configured to specific requirements through the geometric parameters of the individual elements. Examples of modifications to the geometric parameters may include, for example, but not limited to, air injector shape (e.g., slots, holes, etc.), radial rib shape, etc. Other modifications to the geometric parameters may be made without departing from the scope of the present disclosure.

In some implementations, a control valve to regulate the pumped water flow rate may be provided. The control valve may be located inside the central manifold, elsewhere in the pumped water flow passage, or below the runner cap. The control valve may allow stopping or reducing the pumped water flow when not needed, for example, during low speed operation of the turbine, and may improve the efficiency of the turbine.

Aspects of the present disclosure may be employed in existing or new hydraulic turbines. In addition, various embodiments may be used in any application where aeration or any gas injection is required or where air or any gas needs to be entrained by a water or any fluid of higher density. Various embodiments may be advantageous compared to conventional aerators where a relatively high pressure difference needs to be overcome. Various embodiments may also prove more efficient than conventional types of aerators such as the ones know in areas of wastewater treatment and open water aeration.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. An aeration apparatus for aerating water discharged from a hydraulic turbine, the aeration apparatus comprising:
   a central manifold disposed within a crown of a runner of the hydraulic turbine;
   a plurality of radial pipes extending radially from an outer perimeter of the central manifold and configured to be in fluid communication with the central manifold; and
   one or more air injectors having a first end disposed within an aeration pipe, each of the air injectors having a second end extending into a nozzle at a first end of one of the plurality of radial pipes,
   wherein the plurality of radial pipes are configured to pump water from the central manifold past the one or more air injectors when the runner rotates,
   wherein the one or more air injectors are configured to cause air to become entrained in the water, and
   wherein the plurality of radial pipes are configured to discharge the water and entrained air from the aeration apparatus.

2. The aeration apparatus of claim 1, further comprising a crown chamber including a plurality of water outlet ports disposed around a periphery of the crown chamber, the plurality of water outlet ports configured to be in fluid communication with second ends of the plurality of radial pipes.

3. The aeration apparatus of claim 2, wherein the plurality of radial pipes are configured to discharge the water and entrained air via the plurality of water outlet ports into runner channels.

4. The aeration apparatus of claim 1, wherein the second end of the one or more air injectors comprises one or more slots, one or more holes, or a combination of one or more slots and holes.

5. The aeration apparatus of claim 1, further comprising a water intake port disposed in a lower portion of a crown chamber of the crown, wherein the central manifold is configured to be in fluid communication with the water intake port.

6. The aeration apparatus of claim 1, wherein the nozzle disposed at the first end of the plurality of radial pipes is configured to lower fluid pressure at the second end of the air injectors.

7. The aeration apparatus of claim 1, wherein the aeration pipe is isolated from the central manifold by a solid portion configured to seal a lower portion of the aeration pipe such that water drawn into the central manifold is not drawn into the aeration pipe.

8. A hydraulic turbine runner, comprising:
   a crown;
   a plurality of runner blades coupled to the crown; and
   an aeration apparatus disposed within the crown, the aeration apparatus configured for aerating water discharged from a hydraulic turbine, the aeration apparatus comprising:
      a central manifold disposed within the crown;
      a plurality of radial pipes extending radially from an outer perimeter of the central manifold and configured to be in fluid communication with the central manifold; and
      one or more air injectors having a first end disposed within an aeration pipe, each of the air injectors having a second end extending into a nozzle at a first end of one of the plurality of radial pipes,
      wherein the plurality of radial pipes are configured to pump water from the central manifold past the one or more air injectors when the runner rotates,
      wherein the one or more air injectors are configured to cause air to become entrained in the water, and
      wherein the plurality of radial pipes are configured to discharge the water and entrained air from the aeration apparatus.

9. The hydraulic turbine runner of claim 8, wherein the aeration apparatus further comprises a crown chamber including a plurality of water outlet ports disposed around a periphery of the crown chamber, the plurality of water outlet ports configured to be in fluid communication with second ends of the plurality of radial pipes.

10. The hydraulic turbine runner of claim 9, wherein the plurality of radial pipes are configured to discharge the water and entrained air via the plurality of water outlet ports into runner channels.

11. The hydraulic turbine runner of claim 8, wherein the second end of the one or more air injectors comprises one or more slots, one or more holes, or a combination of one or more slots and holes.

12. The hydraulic turbine runner of claim 8, wherein the aeration apparatus further comprises a water intake port disposed in a lower portion of a crown chamber of the crown, wherein the central manifold is configured to be in fluid communication with the water intake port.

13. The hydraulic turbine runner of claim 8, wherein the nozzle disposed at the first end of the plurality of radial pipes is configured to lower fluid pressure at the second end of the air injectors.

14. The hydraulic turbine runner of claim 8, wherein the aeration pipe is isolated from the central manifold by a solid portion configured to seal a lower portion of the aeration pipe such that water drawn into the central manifold is not drawn into the aeration pipe.

15. A hydraulic turbine, comprising:
    a turbine shaft; and a turbine runner coupled to the turbine shaft, the turbine runner comprising;

a crown;

a plurality of runner blades coupled to the crown; and an aeration apparatus disposed within the crown, the aeration apparatus configured for aerating water discharged from a hydraulic turbine, the aeration apparatus comprising:

a central manifold disposed within the crown;

a plurality of radial pipes extending radially from an outer perimeter of the central manifold and configured to be in fluid communication with the central manifold; and one or more air injectors having a first end disposed within an aeration pipe, each of the air injectors having a second end extending into a nozzle at a first end of one of the plurality of radial pipes, wherein the plurality of radial pipes are configured to pump water from the central manifold past the one or more air injectors when the runner rotates, wherein the one or more air injectors are configured to cause air to become entrained in the water, and wherein the plurality of radial pipes are configured to discharge the water and entrained air from the aeration apparatus.

16. The hydraulic turbine of claim 15, wherein the aeration apparatus further comprises a crown chamber including a plurality of water outlet ports disposed around a periphery of the crown chamber, the plurality of water outlet ports configured to be in fluid communication with second ends of the plurality of radial pipes, wherein the plurality of radial pipes are configured to discharge the water and entrained air via the plurality of water outlet ports into runner channels.

17. The hydraulic turbine of claim 15, wherein the second end of the one or more air injectors comprises one or more slots, one or more holes, or a combination of one or more slots and holes.

18. The hydraulic turbine of claim 15, wherein the aeration apparatus further comprises a water intake port disposed in a lower portion of a crown chamber of the crown, wherein the central manifold is configured to be in fluid communication with the water intake port.

19. The hydraulic turbine of claim 15, wherein the nozzle disposed at the first end of the plurality of radial pipes is configured to lower fluid pressure at the second end of the air injectors.

20. The hydraulic turbine of claim 15, wherein the aeration pipe is isolated from the central manifold by a solid portion configured to seal a lower portion of the aeration pipe such that water drawn into the central manifold is not drawn into the aeration pipe.

* * * * *